United States Patent [19]

Nausedas

[11] Patent Number: 5,152,712
[45] Date of Patent: Oct. 6, 1992

[54] STUFFING METHOD AND APPARATUS
[75] Inventor: Joseph A. Nausedas, Oak Forest, Ill.
[73] Assignee: Viskase Corporation, Chicago, Ill.
[21] Appl. No.: 425,435
[22] Filed: Oct. 26, 1989

Related U.S. Application Data

[63] Continuation-in-part of Ser. No. 297,364, Jan. 17, 1989, abandoned.

[51] Int. Cl.⁵ ............................................. A22C 11/50
[52] U.S. Cl. ...................................... 452/38; 452/37; 452/33
[58] Field of Search .................. 17/41, 35, 33, 36, 37, 17/38, 39, 40, 42, 49; 426/140, 284; 452/32, 30, 33, 35, 37, 38

[56] References Cited

U.S. PATENT DOCUMENTS

| | | | |
|---|---|---|---|
| 3,115,668 | 12/1963 | Townsend | 17/49 |
| 3,115,700 | 12/1963 | Marbach | 17/41 |
| 3,404,430 | 10/1968 | Kielsmeier et al. | 17/45 |
| 4,023,238 | 5/1917 | Phares | 17/41 |
| 4,321,728 | 3/1982 | Marz | 17/41 |
| 4,430,772 | 2/1984 | Michel et al. | 17/33 |
| 4,593,434 | 6/1986 | Townsend | 17/41 |
| 4,649,602 | 3/1987 | Kupcikevicius | 17/49 |

FOREIGN PATENT DOCUMENTS 2402617 9/1984 Fed. Rep. of Germany .

Primary Examiner—Willis Little
Attorney, Agent, or Firm—Roger Aceto

[57] ABSTRACT

A stuffing apparatus and method which avoids the smearing of fat just under the casing surface by using a stuffing horn which discharges food product in an axial stream and a plurality of radial streams so the food product swirls as it enters the casing. The horn extends into the casing during stuffing so that the casing is in an expanded and substantially fully stuffed condition as it traverses the radial streams being discharged into the casing.

8 Claims, 1 Drawing Sheet

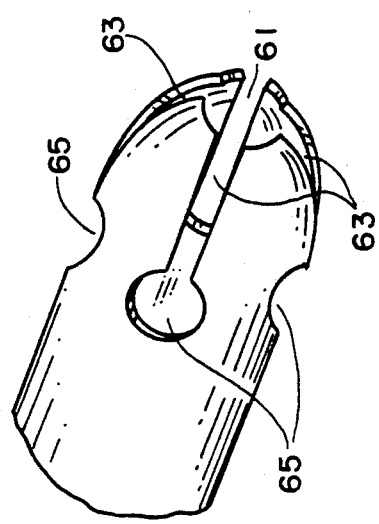
FIG. 3
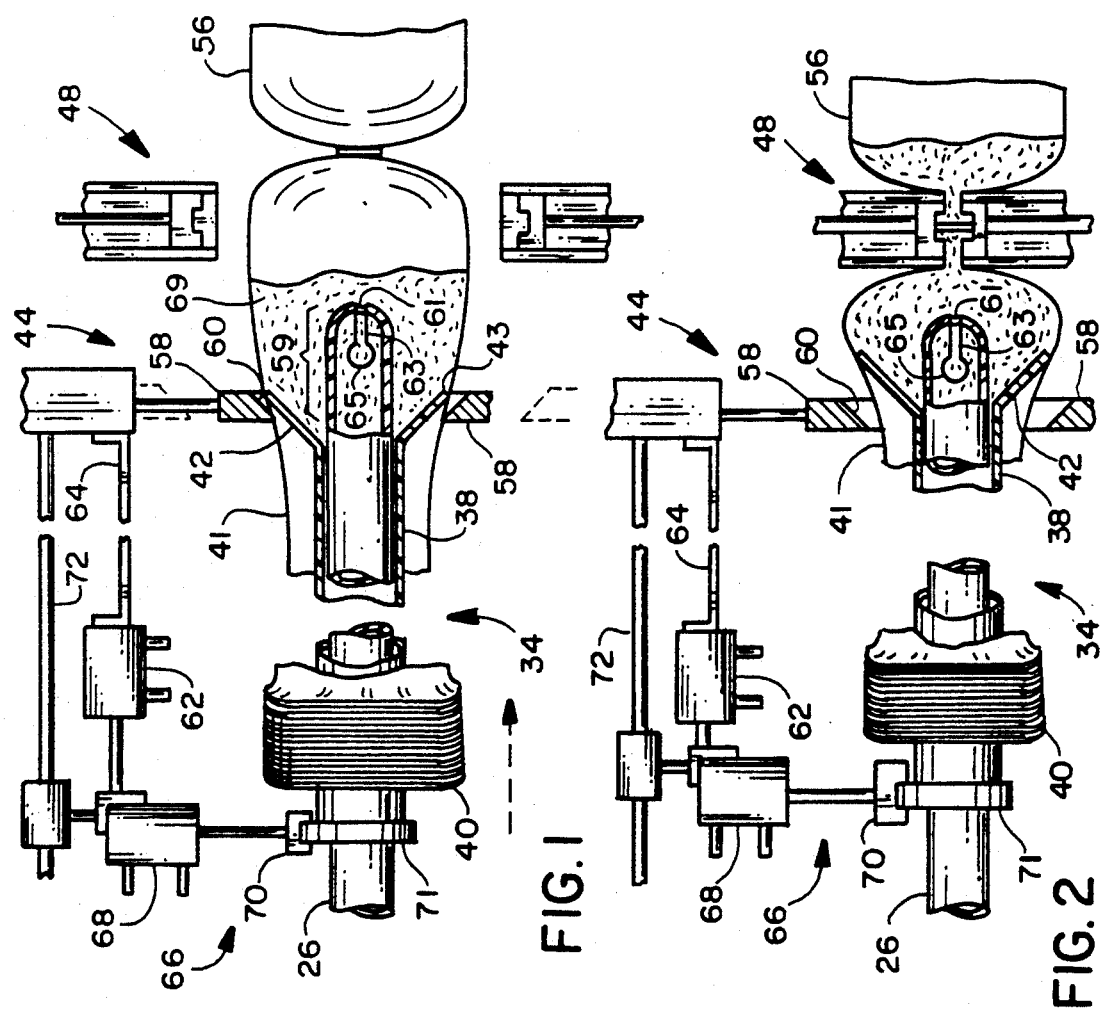
FIG. 1
FIG. 2

STUFFING METHOD AND APPARATUS

CROSS-REFERENCE TO RELATED APPLICATION

This application is a continuation-in-part of prior U.S. patent application Ser. No. 07/297,364, filed Jan. 17, 1989, now abandoned.

TECHNICAL FIELD

The present invention relates to a stuffing system and more particularly to a stuffing method and apparatus for the production of sausages which prevents the accumulation of fat at the surface of the sausage commonly known as "smear".

BACKGROUND OF THE INVENTION

Automatic stuffing machines for producing stuffed sausage-type products are well known in the art. These machines operate automatically in that they utilize casing in the form of a shirred stick so that a plurality of stuffed products can be made using the casing contained in a single stick.

The term "shirred stick" is well known in the stuffing art and describes a hollow casing article composed of a relatively long length of casing shirred and longitudinally compacted to a short length. For example, a shirred stick 50 centimeters long may contain upwards of 50 meters or more of casing. After a shirred stick is located on a stuffing horn the machine can operate automatically until the supply of casing is exhausted.

In a typical stuffing operation a shirred stick is loaded on to a stuffing horn and a pump is started for forcing the food product to be stuffed through the stuffing horn under pressure. The food product which discharges from the horn enters and draws forward casing from the shirred stick to stuff the casing. After a desired length is stuffed, the pump is stopped and a closure is applied. The pump is then restarted to stuff another length of casing. Stuffing and closing in this fashion continues until the casing supply is exhausted.

The stuffed products are then processed to dry, cook or smoke them. After processing, the casing can be removed and the stuffed products individually packaged in a suitable packaging, such as a shrink wrap, for retail sale.

To facilitate stuffing, it is known to open or circumferentially stretch the casing with a means (hereinafter "sizing means") disposed about the horn just prior to introducing the food product. During this food introduction or stuffing, the casing is drawn forward from the shirred stick and over the sizing means which opens and expands the casing. The casing continues to be drawn forward by product introduction and is eventually stuffed with food product discharging from the horn. After passing over the sizing means, the casing can be filled in its open condition (as shown in U.S. Pat. No. 4,321,728) wherein the pressure of the outer circumference of the sizing means against the casing provides a seal to prevent the back flow of the food product along the horn. In the alternative, after passing over the sizing means, the casing an be snugged inward against the horn (as shown in U.S. Pat. No. 4,649,602) to provide the seal.

One problem associated with stuffing many types of sausages containing a meat-fat mixture is that the fat component tends to smear along the inside surface of the stuffing horn as the mixture moves through the horn. The result, as the mixture exits the horn, is that an objectionable layer of fat develops just under the casing inner wall surface at the outer surface of the food product stuffed into the casing. This fat layer is commonly referred to as "smear" or "fat smear" and various means have been employed in attempts to eliminate its occurrence as it detracts from the appearance of the stuffed product.

For example, U.S. Pat. No. 4,023,238 discloses a telescoping stuffing horn which is length adjustable so that the discharge end of the stuffing horn can be inserted into the interior of the casing during stuffing. Projection of the discharge end into the casing in this fashion is said to prevent accumulation of fatty deposits on the inside surface of the stuffed casing.

In U.S. Pat. No. 3,404,430 the discharge end of the horn is notched. The notches are said to allow coarse particles of the ground sausage batter to migrate to the surface of the casing to eliminate the homogeneous or smeared surface appearance.

In German Patent 24 02 617 the stuffing horn is provided with four round openings near its discharge end. Slots extend forward from each opening to the discharge end of the horn wherein the width of each slot tapers from a maximum width corresponding to the diameter of each hole, to a minimum width at the discharge end of the horn. This configuration is said to eliminate the fat layer under the casing inner surface by creating turbulence in the flow of the food product from the horn. Due to this turbulence, the fat layer forming along the inner wall of the stuffing horn as the sausage meat moves through the horn is mixed with the sausage meat as it discharges from the horn.

While the foregoing prior art publications disclose various arrangements for dealing with the problem of smear, alternate or improved arrangements are desireable. In particular, a method and apparatus is desired for eliminating smear in a stuffing system utilizing an internal sizing means which circumferentially stretches it prior to the introduction of the food product into the casing.

OBJECT OF THE INVENTION

One object of the invention is to provide a stuffing apparatus and method which avoid the problem of smear when stuffing a variety of sausage products.

Another object is to provide a method of, and apparatus for, preventing smear when stuffing is being accomplished with a stuffing machine utilizing an internal sizing means for circumferentially stretching the casing just prior to the introduction of the food product into the casing.

A further object is to provide a stuffing machine and method which avoid the problem of smear when stuffing into a casing which is at substantially its fully expanded diameter when food product is introduced into the casing.

SUMMARY

In one aspect, the present invention is a stuffing apparatus comprising:
a) a stuffing horn having a discharge end portion including
  i) an axial outlet at one end for dispensing a food product under pressure from said discharge end portion in a forwardly directed longitudinal stream, said axial outlet being smaller than the inside diameter of said stuffing horn and ii) a plurality of radial openings spaced about the periphery of said discharge end portion for dispensing said food product under pressure in a plurality of radially directed steams, said radial openings each being equidistant in an aft direction from said axial outlet;

b) a shirred casing supply on said horn, said casing supply having a deshirred portion which extends longitudinally forward over said discharge end portion;

c) an annular sizing member disposed within said deshirred portion of said casing at a position spaced aft of said radial openings, said sizing member having an outer rim which contacts the inner surface of said deshirred casing and which is greater in circumference than the unstretched circumference of said deshirred casing for circumferentially stretching said casing as said deshirred casing passes forward over said sizing member;

d) said deshirred casing extending forward from the outer rim of said sizing member being in a substantially fully expanded condition and substantially fully stuffed with food product discharged from said radial openings and axial outlet such that a substantially cylindrical volume, as defined by the diameter of said sizing member and the length of said deshirred casing from said sizing member to said axial outlet, is stuffed with said food product; and e) said sizing member rim in contact with the inner surface of said deshirred casing effecting a food product seal therebetween to prevent the back flow of food product to the rear of said sizing member.

In another aspect, the present invention is a stuffing method wherein a food product is stuffed under pressure through a stuffing horn and into casing which is deshirred and drawn forward from a shirred supply mounted on the horn comprising the steps of:

a) contacting the outer rim of an annular sizing member against the inner periphery of the deshirred casing and radially expanding said deshirred casing substantially to its fully stuffed diameter as the casing draws forward from the shirred supply;

b) maintaining said deshirred casing expanded to its substantially fully stuffed diameter as it draws forward from said sizing member and discharging a food product under pressure into the volume of said expanded casing i) in a single longitudinal stream from an axial outlet at an end of said horn and simultaneously ii) in a plurality of radial streams from openings located about the periphery of said horn and spaced equidistant from said axial outlet;

c) locating said sizing member relative to said openings such that said drawn forward casing attains substantially its fully stuffed diameter prior to traversing said openings and said discharging streams swirling into and filling the drawn forward casing back to said sizing member; and d) effecting a food product seal between the rim of the sizing member and the inner periphery of the deshirred casing to prevent the back flow of food product along said horn to said shirred casing supply.

DESCRIPTIONS OF THE DRAWINGS

FIG. 1 is a view partly broken away and in section showing a portion of the stuffing system of the present invention in a stuffing mode;

FIG. 2 is a view similar to FIG. 1 only showing the system in a clipping mode; and FIG. 3 is a view on an enlarged scale showing the discharge end of a stuffing horn as may be used in the system of the present invention.

DESCRIPTION OF THE EMBODIMENTS

Referring to the drawings, FIGS. 1 and 2 show the stuffing machine of the present invention. The machine includes a stuffing horn 26. On the horn is a shirred casing article generally indicated at 34. The casing article per se forms no part of the present invention and is more particularly described in U.S. Pat. No. 4,649,602 the disclosure of which is incorporated herein by reference. It is sufficient for purposes of the present invention merely to say that each casing article includes an elongated tubular core 38 which carries a shirred length of casing 40 (hereafter referred to as a "shirred stick"). Preferably the shirred stick grips tightly about the core so that the friction therebetween prevents the shirred stick from sliding along the core. Each tubular core 38 also has a sizing means 42 at one end. The sizing means is generally conical in shape and has a fixed circumference which is larger than the unstretched circumference of the casing contained in the shirred stick so that the casing is stretched circumferentially (and transversely expanded) as it draws forward from the shirred stick and passes over the sizing means during stuffing.

Associated with the stuffing horn is a casing brake generally indicated at 44. The casing brake of the stuffing machine and the sizing means of the casing article cooperate to control the drag on the casing as the casing deshirrs and draws forward from the shirred stick during stuffing. As will be further described hereinbelow, the amount of the drag exerted on the casing determines in part its stuffed diameter.

Also associated with the stuffing horn is a clipper carriage, a portion of which is generally indicated at 48. Clipper carriages are well known in the art and will be described herein only to an extent sufficient for an understanding of the present invention. Briefly, a clipper carriage is disposed forward of a stuffing horn to close the stuffed casing. This is done by gathering the stuffed casing towards the longitudinal axis of the stuffed casing and then attaching a clip to the gathered casing. The clipper can apply one or two clips as desired. For example, a single clip is used to form both the trailing end of one stuffed product and the leading end of the following stuffed product. Two adjacent clips are used in order to permit separation of the stuffed products and for this purpose the clipper also has a knife (not shown) to sever the casing between the two adjacent clips. The clipper further may include a looper mechanism (not shown) which attaches a loop along with one of the clips so a string of stuffed products can be hung for processing. The operation of clipper carriages in cooperation with stuffing machines is shown in U.S. Pat. Nos. 4,438,545; 4,675,945; 4,437,209 and 4,773,128 among others.

As mentioned hereinabove, the casing article preferred for use with the apparatus of the present invention is a cored casing article of the type disclosed in U.S. Pat. No. 4,649,602. Such an article includes a disposable plastic core 38 which has an outwardly flared end serving as a sizing means 42. Disposed on the core is a shirred stick 40. A portion of casing which deshirrs from the stick is shown at 41.

During stuffing, casing 41 draws forward from the shirred stick and over the sizing means 42. The circumference of the outwardly flared end 43 of the sizing means preferably is greater than the unstretched circumference of the casing 41 so that the casing is stretched circumferentially as it passes over the sizing means. The stretching of the casing by the sizing means not only expands and prepares the casing for stuffing, but also provides a seal between the casing and the flared end 43 to prevent food product from flowing back around the sizing means.

Casing brake 44 includes a pair of split jaws 58 which are movable between an open position and a closed position. When the jaws are in the open position (shown in dotted line in FIG. 1), the casing brake 44 is clear of the sizing means 42 to facilitate the loading and unloading of casing articles.

When the jaws are in the closed position (shown in solid line) the casing brake 44 can cooperate with the sizing means to control the stuffed diameter of the casing. In this respect, the jaws 58, in the closed position, define an outwardly flared inner surface 60 which substantially matches the flare of the sizing means 42. By adjusting the relative longitudinal position between the sizing means and the flared surface 60, the drag or tension on the casing can be adjusted to increase or decrease the stuffed diameter of the casing. For example, in the position as shown in FIG. 1 the distance between the flared surface 60 and the sizing means 42 is at a minimum so the drag on the casing is high. The result is that the diameter of the stuffed casing is at a maximum. Increasing the relative longitudinal spacing between the casing brake and sizing means reduces the drag on the casing with the result that the stuffed diameter decreases.

Adjusting the spacing between sizing means 42 and the casing brake 44 is accomplished in the present invention by moving the casing article 34 relative to the brake. As shown in FIG. 1, the apparatus for accomplishing this relative motion includes an air cylinder 62 which is fixed to the casing brake 44 by a bracket 64. The air cylinder 62 is connected to a gripper mechanism generally indicated at 66 which grips the end of the tubular core. The gripper mechanism includes a second air cylinder 68 which operates a latch 70 that is adapted to engage a flange 71 on the aft end of the core 38. When the latch 70 and flange 71 are engaged, increasing the pressure in air cylinder 62 so as to increase the force pushing the casing article in an aft direction (to the left as viewed in the figures), will increase the drag on the casing. Conversely, decreasing the pressure in the air cylinder 62 decreases the drag on the casing. A guide 72 is provided for insuring that the forward and aft motion of the gripper means 66 is rectilinear.

It should be appreciated that movement of the casing article in a forward direction may be utilized to facilitate the gathering and clipping of the casing by the clipper carriage 48. For example, as shown in FIG. 2 the casing article 34 has been moved to a position spaced forward from the casing brake 44 to reduce the drag on the casing to a minimum. In this position, closing the clipper carriage 48 about the stuffed casing, as shown, will allow casing 41 to draw forward from the shirred stick 40 to provide the casing needed for gathering together to form the closed ends of the chubs.

As shown in FIGS. 1 and 2 (and as best seen in FIG. 3) a preferred stuffing horn has a restricted outlet 61 which is smaller in diameter than the inside diameter of the stuffing horn. Four slots 63 spaced about the horn each extend longitudinally from the restricted outlet and terminate in an opening 65. Thus, there are four openings 65 spaced circumferentially around the discharge end of the stuffing horn. The openings 65 may be circular as shown or other shape. Also, slots 63 are not essential to the stuffing method of the invention but are preferred as they prevent clogging of openings 65. The configuration as shown allows food product to exit from the stuffing horn simultaneously in both longitudinal and radial streams so that a swirling and mixing action is created as the food product enters the casing. The swirling action tends to prevent fatty particles from migrating to the inner surface of the casing. This, in-turn, avoids creating an undesirable smear of fat just under the casing.

Extending or "burying" the discharge end of a horn within the stuffed casing so that some length of the stuffing horn is surrounded by the food product also helps to avoid smear.

In this respect, FIG. 1 shows that the end of the stuffing horn as defined by its outlet 61 is spaced forward from the conical sizing means 42. The distance between outlet 61 and the sizing means defines a discharge end portion 59 of the horn which is "buried" within the stuffed casing.

During stuffing as shown in FIG. 1, the casing is expanded by drawing it forward over the sizing means. The food product which discharges in streams from the restricted outlet 61 and circumferential openings 65 swirls into and fills the volume 69 of the expanded casing extending from the discharge outlet 61 back to the sizing means 42. Since the casing brake jaws 58 close against the sizing means 42, the casing is maintained in an expanded condition by the food product in volume 69 as it draws forward of the sizing means and beyond the outlet 61. The expanded casing including a generally cylindrical volume 69 (defined by the diameter of the sizing means and the length of the discharge end portion 59) remains filled as the casing is drawn forward by the pressure of the food product discharging into the casing.

As mentioned above, it is believed that the swirling and mixing action created as the food product discharges into this volume prevents smear. In this respect, it has been found that locating the sizing means too close to the openings 65 tends to increase the likelihood of smear. The likelihood of smear also is increased by using a horn with no circumferential openings (so there is only a longitudinal discharge and no lateral or transverse discharge from the stuffing horn) even if a discharge end portion 59 of the horn is buried in the stuffed casing.

It should be appreciated that when using a horn as shown in FIG. 1, the longitudinal spacing between the generally conical sizing means 42 and the horn outlet 61 for reducing smear may vary depending upon various factors such as the horn diameter, the size and number of openings 65, and the consistency of the food product being stuffed into the casing. It would be well within the ordinary skill of the art to determine the length of the discharge end portion 59 relative to the sizing means 42 which is most effective to minimize smear in any given instance.

This is illustrated by the stuffing of a hard salami product about 52.3 mm in diameter using a horn as shown in the Figures. The horn has a length of about 58.4 cm, an outside diameter of about 25 mm and an inside diameter of about 20 mm. Restricted outlet 61 measures about 12.7 mm in diameter. Four circumferential openings 65, also about 12.7 mm in diameter are located with centers about 20.5 mm from the end of the horn. Slots 63 extending from each opening 65 to outlet 61 are about 1.6 mm wide. The casing for stuffing the salami mixture is a Viskase Corporation size 1M SHIRMATIC® 403 casing having an unstretched diameter of about 45 mm. The conical sizing means 42 has a cone angle of about 45° and an outside diameter of about 50.8 mm.

Placing the outwardly flared end of sizing means too close to the openings 65 (about 27 mm from the horn outlet 61) at the outset of stuffing results in a product having the objectionable smear of fat just under the casing. Moving the sizing means away from the openings 65 to increase the length of the discharge end portion 59 causes a gradual decrease of this smear until the outwardly flared end of sizing means is about 40–45 mm from the outlet 61. At this point, smear is substantially eliminated. Moving it still farther away does not further enhance the appearance of the product. In contrast, using a horn of the same size but without the restricted outlet 61 and circumferential openings 65 does not eliminate smear even when the sizing means is located a distance from the end of the horn greater than 45 mm.

Since the stuffed product is 52.3 mm in diameter and the outside diameter of the conical sizing means is about 50.8 mm in diameter, it should be appreciated that the casing is at substantially its fully expanded and stuffed diameter as it draws forward from the outwardly flared end 43 of the sizing means. Moreover, as shown by the example, the best results, in terms of smear reduction, are obtained when the outwardly flared end 43 of the sizing means is spaced aft or to the rear of the openings 65 as measured from the restricted outlet 61. Thus, the casing attains substantially its fully expanded (and stuffed) condition prior to traversing the radial openings 65 such that the location at which it attains its fully expanded condition is between the radial openings 65 and the seal effected by the outwardly flared end 43 of the sizing means 42.

While the present invention has been described with respect to a preferred embodiment wherein the outer circumference of an internal sizing means is used to provide the seal which prevents back flow along the horn, other arrangements are possible. For example, some stuffing systems use an external casing brake (rather than internal sizing means) to establish the seal that prevents the back flow of the food product along the horn. The external casing brake (as shown for example in U.S. Pat. No. 4,023,238) functions by pressing the casing inward against the horn. If such a break is used, it should be positioned far enough aft of radial openings 65 that the casing attains substantially its fully expanded and stuffed diameter prior to traversing said radial outlets.

Thus it should be appreciated that the present invention accomplishes its intended objects in providing a stuffing method and apparatus which eliminate the problem of fat smear when stuffing a variety of sausage products and particularly when stuffing is accomplished using an internal sizing means.

What is claimed is:

1. A stuffing apparatus comprising in combination:
   a) a stuffing horn having a discharge end portion including
      i) an axial outlet at one end for dispensing a food product under pressure from said discharge end portion in a forwardly directed longitudinal stream, said axial outlet being smaller than the inside diameter of said stuffing horn and
      ii) a plurality of radial openings spaced about the periphery of said discharge end portion for dispensing said food product under pressure in a plurality of radially directed streams, said radial openings each being equidistant in an aft direction from said axial outlet;
   b) a shirred casing supply on said horn, said casing supply having a deshirred portion which extends longitudinally forward over said discharge end portion;
   c) an annular sizing member disposed within said deshirred portion of said casing at a position spaced aft of said radial openings, said sizing member having an outer rim which contacts the inner surface of said deshirred casing and which is greater in circumference than the unstretched circumference of said deshirred casing for circumferentially stretching said casing as said deshirred casing passes forward over said sizing member;
   d) said deshirred casing extending forward from the outer rim of said sizing member being in a substantially fully expanded condition and substantially fully stuffed with food product discharged from said radial openings and axial outlet such that a substantially cylindrical volume, as defined by the diameter of said sizing member and the length of said deshirred casing from said sizing member to said axial outlet, is stuffed with said food product; and
   e) said sizing member rim in contact with the inner surface of said deshirred casing effecting a food product seal therebetween to prevent the back flow of food product to the rear of said sizing member.

2. A stuffing apparatus as in claim 1 including four of said radial openings equally spaced about the periphery of said discharge end portion.

3. A stuffing apparatus as in claim 1 wherein a longitudinal slot extends along said discharge end portion from each of said radial openings to said axial outlet.

4. A stuffing apparatus as in claim 1 wherein said sizing member includes a substantially rigid wall which flares outwardly from said stuffing horn in the direction of said axial outlet, said wall having said outer rim and said outer rim contacting the inner surface of said casing at a location spaced aft from said radial openings.

5. A stuffing apparatus as in claim 4 wherein said wall is disposed at an angle of about 45° with respect to the longitudinal axis of said stuffing horn.

6. A stuffing apparatus as in claim 4 wherein the areas of said axial outlet and each of said radial openings are substantially equal.

7. A stuffing method wherein a food product is stuffed under pressure through a stuffing horn and into casing which is deshirred and drawn forward from a shirred supply mounted on the horn comprising the steps of:
   a) contacting the outer rim of an annular sizing member against the inner periphery of the deshirred casing and radially expanding said deshirred casing substantially to its fully stuffed diameter as the casing draws forward from the shirred supply;

b) maintaining said deshirred casing expanded to its substantially fully stuffed diameter as it draws forward from said sizing member and discharging a food product under pressure into the volume of said expanded casing
   i) in a single longitudinal stream from an axial outlet at an end of said horn and simultaneously
   ii) in a plurality of radial streams from openings located about the periphery of said horn and spaced equidistant from said axial outlet;

c) locating said sizing member relative to said openings such that said drawn forward casing attains substantially its fully stuffed diameter prior to traversing said openings and said discharging streams swirling into and filling the drawn forward casing back to said sizing member; and d) effecting a food product seal between the rim of the sizing member and the inner periphery of the deshirred casing to prevent the back flow of food product along said horn to said shirred casing supply.

8. A method as in claim 7 including discharging four radial streams of said food product into said deshirred casing.

* * * * *